Jan. 21, 1969  R. W. GORDON  3,422,723

LIQUID-PROPELLENT GUNS AND RELATED DEVICES

Filed Nov. 29, 1966

3,422,723
LIQUID-PROPELLENT GUNS AND RELATED DEVICES
Rodney W. Gordon, 28 Keyport Road, New Monmouth, N.J. 07748
Filed Nov. 29, 1966, Ser. No. 597,643
U.S. Cl. 89—8      4 Claims
Int. Cl. F41f *11/00;* F41f *17/14*

ABSTRACT OF THE DISCLOSURE

An apparatus for valving liquid propellents to combustion chambers, and for sealing combustion chambers, in cyclic explosion engines such as liquid-propellent guns.

---

The apparatus includes a high-strength combustion chamber valve to seal against pressures of propellent decomposition or combustion, combined with a metering valve to feed propellent to a combustion chamber. These are arranged such that the metering valve and accordingly the supply or source of propellent are not subjected to high combustion chamber pressures. The purpose is to enable pressure-sensitive liquid-explosive materials to be fed to chambers subjected periodically or cyclically to high pressures, without high pressures being able to reach propellent source through metering or feed valves, or through propellent feed or supply lines. And the purpose is also to permit the use in high-pressure cyclic devices of propellent feed control valves which need not be, or which cannot be, designed to withstand extremely high pressures.

This invention relates particularly to liquid propellent guns. But it will be understood that the invention is equally applicable to other devices that may use liquid propellants or similar materials as fuel or source of power such as devices to drive fastenings, devices to swedge or crimp or press metallic parts or parts of other materials, devices to provide power for movement of parts such as controls in aircraft and rockets, devices such as internal combustion engines to operate in locations where external air or oxygen for combustion of conventional fuels is not available, and other devices, these being given as examples only.

Liquid propellents are unlike conventional liquid fuels in that external air or oxygen is not required for their combustion, single-part propellents being combustible and explosive as stored or carried in fuel tanks or cylinders. Leakage of gasses from combustion pressures into passages communicating with a supply of liquid propellent, therefore, represents a hazardous condition as the supply of propellent may thereby be ignited to explode. For use with liquid propellents at pressures suitably high to be useful, conventional valves interposed between pressures of combustion and source of propellent cannot be made to remain entirely leak-proof in repeated use. It is an object of this invention to provide novel valving of propellent to a combustion chamber wherein the supply of propellent feeding said valve is separated from the pressures of combustion at the time of ignition, and wherein valves controlling the feed of propellent to a combustion chamber are not subjected to the extremely high pressures of combustion, and may be subjected to atmospheric pressures only at times of said combustion.

Liquid propellent guns are unlike conventional shell-case or bag ammunition guns in that it is necessary that a breech opening into a liquid propellent gun chamber be sealed not only at the time the gun is fired as with conventional guns, but also at the time the gun is being loaded or when propellent is being introduced into or stored within a chamber. It is a further object of this invention to provide novel breech closure means to maintain a seal to ports leading into a combustion chamber during its movement from charging to firing configuration and which has provision to move and seal under conditions of dimensional changes resulting from heat build-up.

Further objects of this invention will appear from the following explanation:

In carrying out this invention in the embodiment explained, a liquid propellent combustion chamber is provided with ports for propellent inlet and scavaging, and may also be provided with ports for projectiles. These ports are opened and closed by a sliding valve or sliding breech block, which slide valve or breech block moves within a member secured to a member containing a combustion chamber or gun chamber. The slide valve or breech block is also provided with ports for prepellent inlet and scavaging and for projectiles. When the slide valve or breech block is open, the ports therein are aligned with the respective ports to the combustion chamber. When the slide valve or breech block is closed, however, these ports do not align and the ports to the combustion chamber are closed by the face of the slide valve or breech block.

The slide valve or breech block is tapered or wedge-shaped and fits moveably into a slot in member secured to member containing a combustion chamber, which slot has a matching tapered or wedge-shaped surface or seat. When the slide valve or breech block is in closed or in firing configuration, it seats against this matching tapered surface and its face is held or wedged thereby against the ports to the combustion chamber to seal these ports against the high pressures of combustion. When the slide valve or breech block is open or is in charging configuration, however, its face is held against the ports to the combustion chamber by spring-loading or other resilient means. At all times during its movement or at rest, the face of the slide valve or breech block is held against the ports to a combustion chamber by this spring-loading or other resilient means to seal said ports. And when the slide valve or breech block is closed and may be subjected to the high pressures of combustion, the mechanical strength and rigidity necessary to seal said ports is provided by the wedge seat. Travel of the slide valve or breech block to its closed or firing configuration is limited only by the tapered surfaces coming together to wedge the slide valve or breech block face against said ports. No clearances are therefore necessary to prevent the slide valve or breech block from becoming frozen or sticking due to temperature increase, since the wedge seat accommodates dimensional changes, as does the spring-loading or other resilient means.

Within the slide valve or breech block is located a spring-loaded or spring-biased differential diameter valve. This differential diameter valve is located in the slide valve or breech block in such position that when the breech block or slide valve is open or is in charging configuration, the differential diameter valve aligns with and communicates with the inlet port to the combustion chamber. The differential diameter valve is also so located that when the slide valve or breech block is closed or is in firing configuration, said differential diameter valve aligns with and communicates with a vent to the atmosphere. In other words, the differential diameter valve is carried by the slide valve or breech block to the port to the combustion chamber for charging, and away from said port to a vent to the atmosphere while the face of the slide valve or breech block seals said port for firing. An annular space surrounds the forward or small diameter of the differential diameter valve, which small diameter seats in a valve seat inside the face of the slide valve or breech block. Said annular space also surrounds the larger diameter of the differential diameter valve, which larger diameter serves as a piston within a cylinder. Propellant delivered to said annular space under pressure causes the differential diameter valve to move away from and to open the valve seat inside the face of the slide valve or breech block, and propellant may then flow through said seat to the combustion chamber to charge said combustion chamber. Release of propellant pressure causes valve to close as a result of urgings from a spring. The said annular space is ported to a connection for a flexible feed line from source of propellant, which flexible feed line allows the slide valve or breech block to move or reciprocate with the connection to propellant source not being broken and without the introduction of additional potential sources of leakage and advantages thereof will clearly appear from a description of the invention as hereinafter set forth in detail and from the drawings made a part thereof in which:

Figure 1:
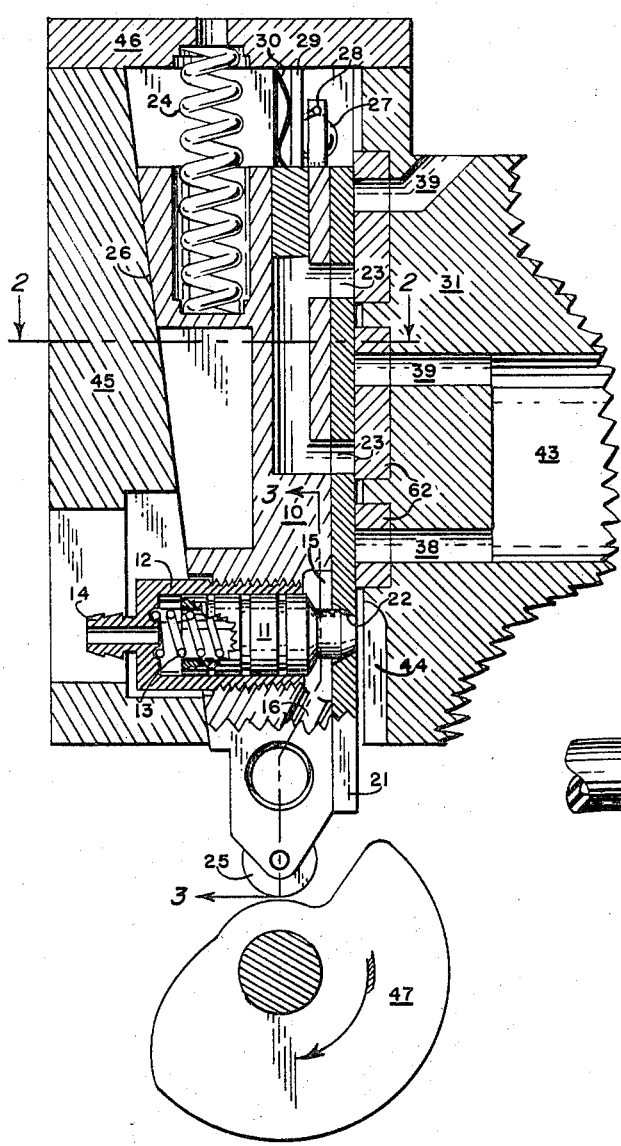
FIGURE 1 is a sectional side elevational view of a combustion chamber and a slide valve or breech block incorporating an embodiment of this invention.
Figure 2:
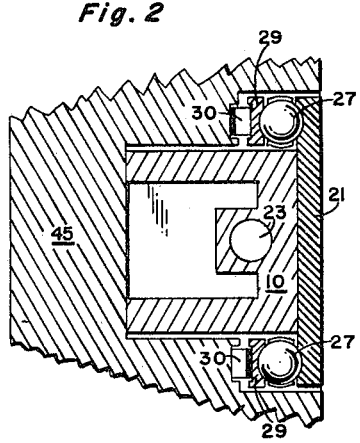
FIGURE 2 is a sectional plan view of a slide valve or breech block incorporating an embodiment of this invention taken through line 2—2 of FIGURE 1.
Figure 3:
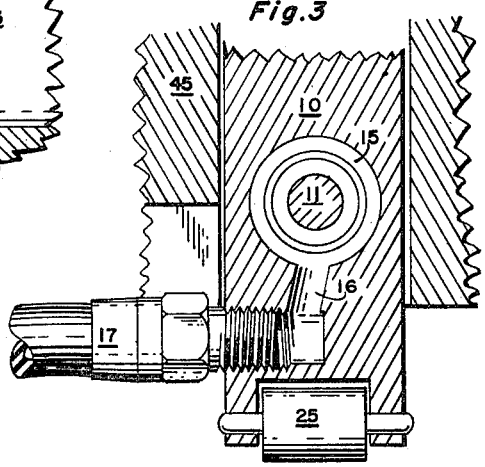
FIGURE 3 is a sectional front elevational view of a slide valve or breech block incorporating an embodiment of this invention taken through line 3—3 of FIGURE 1.

Referring to FIGURES 1, 2, and 3, a combustion chamber is shown at 43 in FIGURE 1, which combustion chamber 43 consists of a cavity within combustion chamber member 31 and is shown in FIGURE 1 as a cylinder but not restricted to any particular shape. Also provided within combustion chamber member 31 and communicating with combustion chamber 43 are propellant inlet port 38 and scavaging ports 39. Inlet port 38 and scavaging ports 39 are provided disposed thereabout with valve seat inserts 62. Also provided in combustion chamber member 31 is vent 44 communicating with the atmosphere but not communicating with combustion chamber 43.

A slide valve or breech block retaining member 45 is secured to combustion chamber member 31, which member 45 is provided with a rectangular and T shaped slot as shown in plan in FIGURE 2, which slot in said member 45 is also tapered at its aft surface or is wedge shaped as shown at 26 in elevation in FIGURE 1. Within said slot in member 45 is slideably disposed a slide valve or breech block 10, shown in FIGURE 1 arranged for movement upward and downward. To said slide valve or breech block 10 is secured slide valve or breech block face plate 21. Slide valve or breech block 10 is rectangularly shaped as shown in plan in FIGURE 2 and is also tapered or wedge shaped at its aft surface as shown at 26 in elevation in FIGURE 1, which tapered surface 26 of slide valve or breech block 10 is of similar angle to taper in slot of slide valve or breech block retaining member 45 but is reversed end for end with respect thereto and is so disposed with respect to valve seat inserts 62 that forward surface of face plate 21 will move parallel to aft surfaces of said valve seat inserts 62 and toward aft surfaces of said valve seat inserts 62 as tapered surfaces 26 come slideably together a slide valve or breech block 10 moves downward. Slide valve or breech block 10 may thereby be wedged by tapered surfaces 26 to seal against valve seat inserts 62 at inlet 38 and scavaging 39 ports to a combustion chamber 43.

Face plate 21 of slide valve or breech block 10 extends beyond the edges of slide valve or breech block 10 as shown in plan in FIGURE 2. Aft edges of said face plate 21 where said face plate 21 extends beyond said slide valve or breech block 10 are arranged to serve as vertical bearing surfaces for movement parallel to aft surfaces of valve seat inserts 62. Spring-loaded bearing means is provided disposed between said bearing surfaces of face plate 21 and slots or grooves provided in member 45, which slots or grooves are shown in FIGURE 2 and which slots or grooves are disposed parallel to aft surfaces of valve seat inserts 62 and parallel to said bearing surfaces of said face plate 21. In FIGURES 1 and 2, slide valve or breech block face plate 21 is shown serving as an outer bearing race and an inner bearing race 29 is shown spring-loaded or urged toward valve seat inserts 62 by corrugated springs 30, with bearing balls 27 in ball retainers 28 disposed between said inner 29 and outer 21 races.

In the embodiment explained, slide valve or breech block 10 is urged downwards by spring 24 disposed between said slide valve or breech block 10 and spring plate 46, which spring plate 46 is disposed above the slot in slide valve or breech block retaining member 45 and is secured to said members 45 and 31. Slide valve or breech block 10 is urged upwards by cam 47 acting on cam follower 25, which cam follower 25 is rotatably secured to slide valve or breech block 10 in such manner that slide valve or breech block 10 will follow cam 47 when influenced upwards by cam 47 and also when influenced downwards by spring 24. Profile of cam 47 is shown such that during its rotation slide valve or breech block 10 remains in an upward position for a longer period of time than in a downward position as upward position in embodiment explained is charging configuration and downward position is firing configuration, more time for charging being shown.

When slide valve or breech block 10 has reached the downward limit of its travel, tapered surfaces 26 have come together and have caused face plate 21 of slide valve od breech block 10 to be wedged against valve seat inserts 62 and downward movement is arrested by this wedging rather than by cam 47, clearance between cam 47 and cam follower 25 being provided for this purpose. During upward movement of slide valve or breech block 10 tapered surfaces 26 of slide valve or breech block 10 and slide valve or breech block retaining member 45 disengage. During upward movement of slide valve or breech block 10, during delay at upward position, and during downward movement prior to wedging of face plate 21 against valve seat inserts 62 by tapered surfaces 26, face plate 21 remains parallel to aft surfaces of and remains in sealing contact with valve seat inserts 62 as a result of urgings of spring-loaded bearing means 27, 28, 29, and 30.

Slide valve or breech block 10 is also provided with scavaging ports 23 so disposed in slide valve or breech block 10 that when slide valve or breech block 10 is at the upward limit of urgings from cam 47 said ports 23 align axially with and communicate with scavaging ports 39 to combustion chamber 43. Said ports 23 in slide valve or breech block 10 are so disposed to vent combustion chamber 43 to atmosphere or to scavaging means as may be used in this invention, when slide valve or breech block 10 is in its upward or open or charging configuration. Said ports 23 are also so disposed in slide valve or breech block 10 that communication between said combustion chamber 43 and said atmosphere or said scavaging means does not exist when said slide valve or breech block 10 is in its downward or closed or firing configuration. When in its downward or closed or firing configuration, face plate 21 of slide valve or breech block 10 seals said ports 39 and also port 38 by wedging against valve seat inserts as already explained.

Also provided in slide valve or breech block 10 is differential diameter valve 11. Differential diameter valve 11 is slideably disposed within and axially aligned with differential diameter valve cylinder 12 and is urged against differential diameter valve seat 22 in aft surface of slide valve or breach block face plate 21 by spring 13. Said spring 13 is disposed between aft part of differential diameter valve 11 and bottom of bore of differential diameter valve cylinder 12. The portion of the differential diameter valve 11 disposed within said cylinder 12 is arranged as a piston and said piston is of larger diameter than portion of valve 11 which seats against valve seat 22. Disposed about both the larger diameter or piston part and the smaller diameter or valve part of differential diameter valve 11 is an annular space 15 in slide valve or breech block 10. Communicating with said annular space 15 is liquid propellant port 16, to which port 16 is connected flexible propellent feed line 17 shown in FIGURE 3. Flexible propellent feed line 17 permits slide valve or breech block 10 to move as necessary without interruption of communication between source of propellant and annular space 15.

Propellant introduced to annular space 15 under pressure in excess of pressure from spring 13 causes differential diameter valve 11 to move away from valve seat 22 due to hydraulic pressure on the piston part of valve 11 overcoming pressure of spring 13. When valve 11 has thereby moved away from valve seat 22, propellent will flow through valve seat 22. The differential diameter valve 11 is accordingly responsive to open from pressures of propellent delivered to it through flexible feed line 17, and is responsive to closing to removal or to release or reduction of said propellent pressure.

Differential diameter valve cylinder 12 is provided with a passage and means for connection of flexible line or hose shown at 14, the purpose of which is to bleed off propellent which might leak past piston part of differential diameter valve 11 and thereby to prevent hydraulic lock and to maintain pressure differential.

Differential diameter valve 11 is so located and so disposed within slide valve or breech block 10 that when slide valve or breech block 10 is in upward or open or charging configuration valve seat 22 in slide valve or breech block face plate 21 is axially aligned with and is in communication with propellent inlet port 38 to combustion chamber 43. In upward or open or charging configuration, propellent will flow through valve seat 22 to charge combustion chamber 43 responsive to increase in pressure of propellent fed to flexible propellent feed line 17. Differential diameter valve 11 is also so located and disposed within slide valve or breech block 10 that when slide valve or breech block 10 is in its downward or closed or firing configuration valve seat 22 in slide valve or breech face plate 21 is aligned with and is in communication with vent or opening to atmosphere 44 in member 31. No communication therefore exists between pressures of combustion in combustion chamber 43 and differential diameter valve 11, and said valve 11 which communicates with source of propellent need be subjected ot atmospheric pressure only at time of firing.

While not a part of this invention and not therefore shown in the drawings or described in detail, it is obvious that a positive displacement pump may be cammed or otherwise powered and timed to discharge propellent under pressure into flexible feed line 17 when differential diameter valve 11 is aligned with port 38 to combustion chamber 43. It is also obvious that timing of said pump may be such that differential diameter valve 11 will close immediately before slide valve or breech block 10 moves said valve 11 away from communication with port 38 to combustion chamber 43. And it is obvious that other means may also be used to operate and time differential diameter valve and charge combustion chamber 43 as, for example, a timed pressure regulating valve in combination with a pressurized source of propellent.

Ignition means for embodiment shown in FIGURES 1, 2, and 3 is also not a part of this invention and not shown or described in detail, but it is obvious that a permanent electrical or other element or means may be provided in combustion chamber 43 and may be timed to ignite charge of propellent when slide valve or breech block is in its downward or closed or firing configuration.

It is clear from FIGURES 1, 2, and 3, and from the foregoing explanation, that slide valve or breech block 10 can seal ports or openings to a combustion chamber 43 without clearance at said ports or openings being necessary to allow movement of slide valve or breech block 10. It is also clear that the seal against ports or openings to a combustion chamber by slide valve or breech block 10 may be accomplished without freezing or sticking from dimensional changes due to heat build-up as seating along tapered or wedge shaped surfaces 26 may occur at slightly different location when hot than when cold, but seating will nonetheless occur. And it is clear that during time in cycle of devices that may use this invention when charge of propellent is ignited and during time of high pressure in combustion chamber 43 that a valve 11 controlling the flow of propellent to a combustion chamber 43 and communicating with a source of propellent need not be subjected to the high pressures of combustion and may be subjected to atmospheric pressures only.

The invention is described and is shown in the drawings arranged for a single-part propellent. But it is also obvious that propellents may be used in this invention which have a plurality of parts such as a fuel and a seperate oxydizer, for example, and that said propellents having a plurality of parts may be introduced to a combustion chamber 43 separately in this invention by providing a plurality of valves 11 and ports 38 and a plurality of related parts. Propellents may also be in liquid or vaporous or gaseous phase at atmospheric pressures and may be liquified by pressure or not, and this invention is not restricted to the use of propellents in any particular phase or of any particular type.

What I claim is:

1. In devices using liquid propellent the combination of a breech housing having a combustion chamber and a transversely sliding breech block, guide means on the breech housing for guiding the breech block and for sealing the combustion chamber, a propellent injecting valve mounted on said breech block and movable therewith, said breech housing and said breech block each having plural port means for the injection of propellent and scavenging of combustion products, and means to move the breech block transverse to the longitudinal axis of the combustion chamber whereby during the propellent injection and scavenging operations the injecting valve, the breech housing ports and breech block ports are in communication with one another, and when in the firing configuration the respective ports and injecting valve are moved out of alignment, whereby the injecting valve is not subjected to the pressures as may exist in the combustion chamber and the combustion chamber is sealed.

2. The device of claim 1 and said propellent injecting valve being responsive to changes in pressures of propellent fed thereto to cause opening and closing of said propellent valve.

3. The device of claim 1 and also including flexible means for connecting said propellent injecting valve to a supply of liquid propellent, said flexible means permitting said sliding breech block to move independently of said supply of liquid propellent while so connected.

4. The devices of claim 1 and also including said guide means on said breech housing and guide means on said breech block so disposed that two means are thereby provided to urge said breech block to seal said plural port means as said breech block moves between firing and charging configurations, one of said means being a seat angularly disposed with respect to the axis of movement of said transversely sliding breech block to cam said breech block toward said plural port means when said breech block is in firing configuration, the other of said means being spring-loading to urge said breech block toward said plural port means when said breech block is not seated on said angularly disposed seat and when said breech block is in charging configuration.

References Cited

UNITED STATES PATENTS

| | | | |
|---|---|---|---|
| 2,821,885 | 2/1958 | Burk | 89—24 |
| 3,011,451 | 12/1961 | Griffin | 89—7 X |
| 3,138,990 | 6/1964 | Jukes et al. | 89—7 |
| 3,202,055 | 8/1965 | Butler | 89—7 |

SAMUEL W. ENGLE, *Primary Examiner.*